United States Patent [19]

Kinoshita

[11] Patent Number: 4,713,517
[45] Date of Patent: Dec. 15, 1987

[54] CUT CONTOUR DISPLAY METHOD IN WIRE ELECTRIC DISCHARGE MACHINE

[75] Inventor: Mitsuo Kinoshita, Tokyo, Japan
[73] Assignee: Fanuc Ltd., Minamitsuru, Japan
[21] Appl. No.: 807,038
[22] PCT Filed: Apr. 5, 1985
[86] PCT No.: PCT/JP85/00169
  § 371 Date: Dec. 4, 1985
  § 102(e) Date: Dec. 4, 1985
[87] PCT Pub. No.: WO85/04610
  PCT Pub. Date: Oct. 24, 1985

[30] Foreign Application Priority Data

Apr. 7, 1984 [JP] Japan ................. 59-69693

[51] Int. Cl.[4] .................. B23H 7/06; G05B 19/415
[52] U.S. Cl. ............................. 219/69 W; 318/570
[58] Field of Search ............... 219/69 W, 69 C, 69 M; 364/474, 475; 318/568-570; 204/206, 224 M

[56] References Cited

U.S. PATENT DOCUMENTS

| | | | |
|---|---|---|---|
| 4,332,995 | 6/1982 | Ito et al. .................. | 219/69 C |
| 4,546,427 | 10/1985 | Kishi et al. ............... | 318/570 |
| 4,559,601 | 12/1985 | Kishi et al. ............... | 219/69 W |

FOREIGN PATENT DOCUMENTS

| | | | |
|---|---|---|---|
| 112194 | 9/1977 | Japan . | |
| 106994 | 8/1979 | Japan ................. | 219/69 W |
| 117997 | 9/1979 | Japan ................. | 219/69 W |
| 124398 | 9/1979 | Japan . | |
| 56-39825 | 4/1981 | Japan ................. | 219/69 W |
| 56-39832 | 4/1981 | Japan ................. | 219/69 W |
| 107834 | 8/1981 | Japan . | |
| 107836 | 8/1981 | Japan . | |
| 206313 | 12/1983 | Japan ................. | 219/69 C |
| 217223 | 12/1983 | Japan ................. | 219/69 C |

*Primary Examiner*—A. D. Pellinen
*Assistant Examiner*—Geoffrey S. Evans
*Attorney, Agent, or Firm*—Staas & Halsey

[57] ABSTRACT

A cut contour display method in a wire electric discharge machine for subjecting a workpiece to taper cutting by moving a workpiece relative to a wire electrode and moving a wire tensioning guide horizontally has a first step of entering a programmed path (WDP) lying on the lower surface of the workpiece, workpiece thickness, data including a taper angle or a vector indicating a positional offset between the upper and lower surfaces of the workpiece, and data specifying a number of cross-sectional contours. A second step includes obtaining a wire electrode path (WUP) on the upper surface of the workpiece, which is not a programmed surface, by using the programmed path (WDP), workpiece thickness, and the taper angle or vector indicative of the positional offset. A third step includes obtaining coordinate values of points on each cross-sectional contour at an end portion of each block by using data indicative of the wire electrode paths on the upper and lower surfaces of the workpiece and the number n of cross sections. A fourth step includes displaying, on a display unit, the wire electrode paths on the upper and lower surfaces of the workpiece, as well as each cross-sectional contour of the taper-cut surface, by using the data indicative of the wire electrode paths on the upper and lower surfaces of the workpiece and coordinate values of the points on each cross-sectional contour at the end portion of each block.

4 Claims, 10 Drawing Figures

CUT CONTOUR DISPLAY METHOD IN WIRE ELECTRIC DISCHARGE MACHINE

BACKGROUND OF THE INVENTION

This invention relates to a cut contour display method in a wire electric discharge machine. More particularly, the invention relates to a cut contour display method in a wire electric discharge machine for displaying wire electrode paths lying on the upper and lower surfaces of a workpiece, along with a plurality of cross-sectional contours obtained by cutting a taper cut surface by a plurality of planes parallel to the lower surface of the workpiece.

In numerically controlled machining, including wire electrical discharge machining, the common practice is to display the machining path determined by the NC program on a display unit, such as a cathode ray tube (CRT), before actual machining takes place, check the program based on the display and then start the numerically controlled machining operation. In wire electric discharge machining, wherein a wire electrode path on either the upper or lower surface of the workpiece is commanded as the programmed path, the practice in the prior art is to display only the wire electrode path lying on the upper or lower workpiece surface, which constitutes the programmed surface, when the program check is performed.

In a case where taper cutting is carried out by a wire electric discharge machine, however, the contour cut on the upper surface of the workpiece and the contour cut on the lower surface of the workpiece differ. As a result, the taper-cut contour cannot be fully comprehended merely by displaying solely the contour of one surface, namely the upper or lower surface of the workpiece. This constitutes a hindrance to the program checking operation.

SUMMARY OF THE INVENTION

Accordingly, an object of the present invention is to provide a cut contour display method in a wire electric discharge machine, whereby a taper-cut contour can be comprehended with ease and a program checked in a simple manner.

Another object of the present invention is to provide a cut contour display method in a wire electric discharge machine, wherein cut contours on the upper and lower surfaces of a workpiece, namely the wire electrode paths on the upper and lower surfaces of the workpiece, can be displayed on a display unit together with a plurality of cross-sectional contours obtained when a taper-cut surface is cut by a plurality of planes lying parallel to the lower surface of the workpiece.

The present invention provides a cut contour display method in a wire electrical discharge machine for subjecting a workpiece to taper cutting by moving a workpiece relative to a wire electrode and moving a wire tensioning guide horizontally. The method includes a step of entering a programmed path lying on the upper or lower surface of the workpiece, the thickness of the workpiece, a taper angle in each block or a vector indicative of an offset between the upper and lower surfaces of the workpiece at the end of the block, and data specifying a number of cross-sectional contours obtained by cutting a taper-cut surface into a plurality of planes lying parallel to the lower surface of the workpiece; a step of obtaining a wire electrode path on whichever one of the upper and lower surfaces of the workpiece is not a programmed surface by using the programmed path, workpiece thickness, taper angle or vector indicative of the offset between the upper and lower surfaces of the workpiece at the end of the block; a step of obtaining coordinate values of points on each cross-sectional contour at an end portion of each block by using the wire electrode paths on the upper and lower surfaces of the workpiece and the number of cross-sectional contours; and a step of displaying, on a display unit, the wire electrode paths on the upper and lower surfaces of the workpiece as well as each cross-sectional contour by using wire electrode path data for upper and lower surfaces of the workpiece and the coordinate values of the points on each cross-sectional contour at the end portion of each block. According to the present invention, the taper-cut contour can be comprehended with facility from a graphic displayed on the display unit.

DESCRIPTION OF THE PREFERRED EMBODIMENT

As is well-known in the art, a wire electrical discharge machine has a wire electrode stretched between an upper guide, and a lower guide and machines a workpiece by producing an electrical discharge between the wire electrode and the workpiece. The workpiece, secured to a table, is transported in X and Y directions along a cutting contour in response to commands from a numerical control apparatus. When the wire electrode is tensioned normal to the table (workpiece), the upper and lower surfaces of the workpiece will be machined into contours which are identical. If the arrangement is such that the upper guide can be displaced in the X and Y directions (referred to asthe U and V axes) to incline the wire electrode with respect to the workpiece, as by displacing the upper guide in a direction at right angles to the direction of workpiece movement, then the upper and lower surfaces of the workpiece will not be cut to the same contour, and the surface cut by the wire electrode will be inclined. This is so-called taper cutting.

Figure 1:
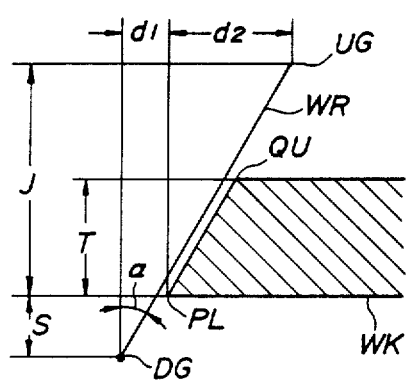
FIGS. 1 and 2 are diagrams for describing taper cutting.

FIG. 1 is a diagram for explaining taper cutting, in which a wire electrode WR is stretched between an upper guide UG and a lower guide DG at a predetermined angle of inclination with respect to a workpiece WK. If we take the lower surface PL of the workpiece WK as the programmed contour (the upper surface QU of the workpiece WK may also serve as the programmed contour), and if we let $\alpha$ denote the taper angle, J the distance from the upper guide UG to the lower surface of the workpiece, and S the distance from the lower guide DG to the lower surface of the workpiece WK, then the offset $d_1$ of the lower guide DG and the offset $d_2$ of the upper guide UG with respect to the lower surface PL of the workpiece, may be expressed as follows:

$$d_1 = S \cdot \tan\alpha + (d/2)$$

$$d_2 = (J + S) \cdot \tan\alpha - S \cdot \tan\alpha - (d/2)$$
$$= J \cdot \tan\alpha - (d/2)$$

Figure 2:
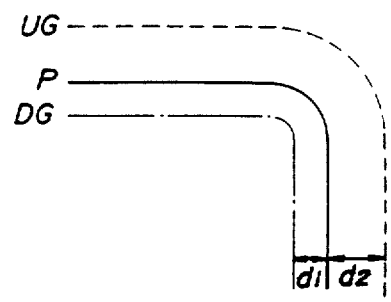

Note that d is the cut width. Accordingly, if, by way of example, the movement of the upper guide UG tensioning the wire electrode WR is so controlled in relation to workpiece movement that the offsets $d_1$, $d_2$ remain constant, then wire electric discharge machining can be carried out at a constant taper angle, as shown in FIG. 2. The dashed line and one-dot chain line in FIG. 2 indicate the paths of the upper and lower guides UG, DG, respectively.

In performing taper cutting with such a wire electric discharge machine, a programmed path on the upper or lower surface of the workpiece, workpiece thickness T, the taper angle $\alpha$ in each block or a vector indicative of the positional offset between the upper and lower surfaces of the workpiece at each block end, and distances J, S are commanded, and cutting is carried out in the manner commanded based on these data.

Figure 3:
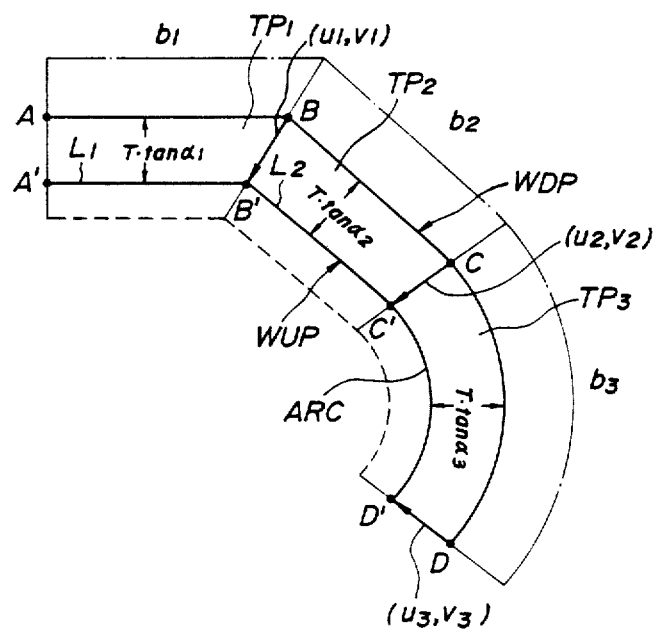
FIGS. 3, 4 and 5 are diagrams for describing a cut contour display method according to the present invention.
Figure 4:
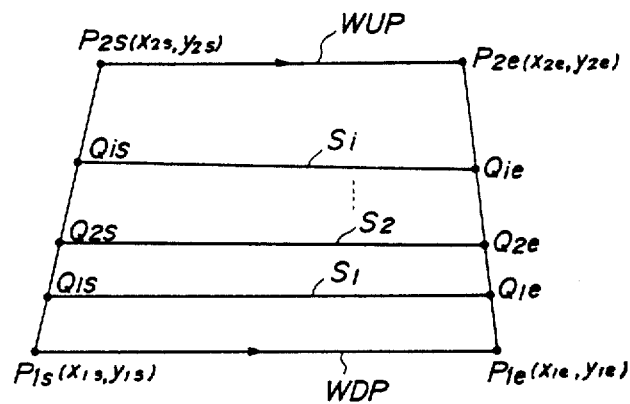
Figure 5:
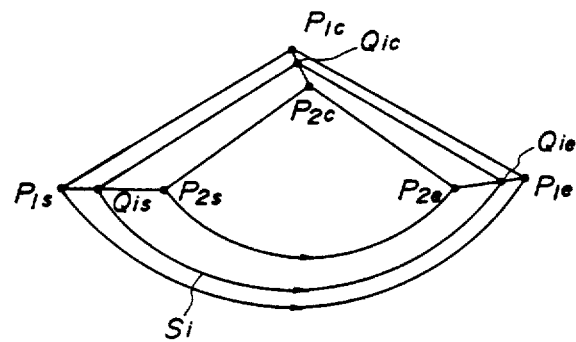

FIGS. 3, 4 and 5 are diagrams for describing a cut contour display method according to the present invention. In FIG. 3, points A, B, C, D ... are points on the cut contour of the lower workpiece surface (on the wire electrode path lying on the lower surface of the workpiece). Straight lines and circular arcs connecting these points are commanded as a programmed path WDP. Commanded together with the programmed path are taper angles $\alpha_i$ (i=1, 2, 3 ...) in respective blocks $b_i$ (i=1, 2, 3 ...) or vectors $(u_i, v_i)$ (i=1, 2, 3 ...) indicative of the positional offset of the wire electrode between the upper and lower surfaces of the workpiece at the ends of respective blocks, as well as the workpiece thickness T. A number n of cross-sectional contours of the tapered surface parallel to the lower surface of the workpiece are entered from an operator's panel. Further, in FIG. 3, straight lines and circular arcs connecting points A', B', C', D' ... the cut contour of the upper workpiece surface (on the wire electrode path WUP lying on the upper surface of the workpiece), the dashed line indicates the path of the upper guide, and the one-dot chain line indicates the path of the lower guide.

The wire electrode path on the lower surface of the workpiece coincides with the programmed path WDP. Accordingly, the wire electrode path on the lower surface of the workpiece can be displayed on a display unit with ease by using the commanded NC program data.

Meanwhile, the wire electrode path WUP on the upper surface of the workpiece is obtained in a manner which will now be set forth. We shall assume that the coordinate values of A' in FIG. 3 are known. At the end of the first block $b_1$, the coordinate values of the wire electrode at point B' on the upper surface of the workpiece are obtained as the point of intersection between a straight line $L_1$, which is offset by $T \cdot \tan\alpha_1$ from a commanded straight line AB on the lower surface of the workpiece in the first block $b_1$, and a straight line $L_2$, which is offset by $T \cdot \tan\alpha_2$ from a commanded straight line BC on the lower surface of the workpiece in the second block $b_2$. At the end of the second block $b_2$, the coordinate values of the wire electrode at point C' on the upper surface of the workpiece are obtained as the point of intersection between the straight line $L_2$, which is offset by $T \cdot \tan\alpha_2$ from the commanded straight line BC on the lower surface of the workpiece in the first block $b_2$, and a circular arc ARC, which is offset by $T \cdot \tan\alpha_3$ from a commanded circular arc CD on the lower surface of the workpiece in the third block $b_3$. Thereafter, and in similar fashion, the wire electrode positions on the upper surface of the workpiece at the end of the respective blocks are found successively by using the commanded paths in the present block $b_i$ and the next block $b_{i+1}$, the taper angles $\alpha_{i}$, $\alpha_{i+1}$, and the workpiece thickness T. The wire electrode path on the upper surface of the workpiece may thus be obtained. It should be noted that the wire electrode path on the upper surface of the workpiece can be obtained without the above-described calculations if the vector $(u_i, v_i)$ indicative of the positional offset between the upper and lower surfaces of the workpiece at the end of each block, is commanded directly instead of the taper angle $\alpha_i$. For example, let $(x_l, y_l)$ represent the coordinate values of the end point B of the first block $b_1$ on the lower surface of the workpiece, and let $(u_l, v_l)$ represent the positional offset vector at the end of the first block $b_l$. The coordinate values of the end point B' of the first block $b_l$ on the upper surface of the workpiece will then be $(x_l + u_l)$, $(y_l + v_l)$.

When the wire electrode position on the upper and lower surfaces of the workpiece at the beginning and end of each block have been calculated through the foregoing processing, these wire electrode position data and the number n of cross-sectional contours obtained by cutting the taper-cut surface by planes parallel to the lower surface of the workpiece are used to obtain the coordinate values of points at the end portion of each block of a respective one of the crosssectional contours.

(A) When the wire electrode path is a straight line

We shall assume that the wire electrode path of a particular block is a straight line, as shown in FIG. 4, that the starting points $P_{2s}$ $(x_{2s}, y_{2s})$, $P_{1s}$ $(x_{1s}, y_{1s})$ of the wire electrode paths on the upper and lower workpiece surfaces, respectively, as well as the end points $P_{2e}$ $(x_{2e}, y_{2e})$, $P_{1e}$ $(x_{1e}, y_{1e})$ of the wire electrode paths on the upper and lower workpiece surfaces, respectively, have been calculated through the above-described processing, and that the number n of cross-sectional contours to be displayed is given.

First, i is initialized by the operation 1→i, and the coordinate values $(x_{is}, y_{is})$, $(x_{ie}, y_{ie})$ of respective points $Q_{is}$, $Q_{ie}$ on an i-th cross-sectional contour $S_i$ at the end of a block are found from the following equations:

$$1/(n+1) \rightarrow k \qquad (1)$$

$$x_{is} = (x_{2s} - x_{1s}) \cdot k \cdot i + x_{1s} \qquad (2)$$

$$y_{is} = (y_{2s} - y_{1s}) \cdot k \cdot i + y_{1s} \qquad (3)$$

$$x_{ie} = (x_{2e} - x_{1e}) \cdot k \cdot i + x_{1e} \qquad (4)$$

$$y_{ie} = (y_{2e} - y_{1e}) \cdot k \cdot i + y_{1e} \qquad (5)$$

When the points $Q_{is}$, $Q_{ie}$ on the cross-sectional contour $S_i$ at the end portion of the block have been found, the cross-sectional contour is displayed by using these point data.

Next, i is counted up in acordance with the expression $$i+1 \rightarrow i \quad (6)$$

and it is determined whether $i \leq n$ holds.

If $i \leq n$ holds, the foregoing processing is repeated with respect to the new i to successively obtain the coordinate values of points $Q_{is}$, $Q_{ie}$ (i=1, 2, 3, ... n) on each cross-sectional contour $S_i$ (i=1, 2, 3, ... n) at the end of the block. The cross-sectional contours are displayed using these coordinate values.

If $i < n$ holds, on the other hand, this means that all cross-sectional contours of the subject block have been generated. This is followed by taper-cut contour processing for the next block.

(B) When the wire electrode path is a circular arc

We shall assume that the wire electrode path is a circular arc, as shown in FIG. 5, that the starting points $P_{2s}$ ($x_{2s}, y_{2s}$), $P_{1s}$ ($x_{1s}, y_{1s}$) of the wire electrode paths on the upper and lower workpiece surfaces, respectively, as well as the end points $P_{2e}$ ($x_{2e}, y_{2e}$), $P_{1e}$ ($x_{1e}, y_{1e}$) of the wire electrode paths on the upper and lower workpiece surfaces, respectively, have been calculated through the processing of the previous step, and that the number n of cross-sectional contours is given. In such case, the coordinate values of points $Q_{is}$, $Q_{ie}$ on each cross-sectional contour $S_i$ (i=1, 2, 3 ... n) at the end of the block and the coordinate values of a center point $Q_{ic}$ of each crosssectional contour are calculated through processing set forth hereinbelow. We will assume that center points $P_{2c}$ ($x_{2c}, y_{2c}$), $P_{1c}$ ($x_{1c}, y_{1c}$) of the arcuate wire electrode paths on the upper and lower surfaces of the workpiece have already been calculated.

First, i is initialized by the operation $1 \rightarrow i$,

Next, the coordinate values of points (circular arc starting and end points of the cross-sectional contour $S_i$) $Q_{is}$, $Q_{ie}$ on cross-sectional contour $S_i$ at the end of the block are found from the equations (1) through (5).

Thereafter, the coordinate values ($x_{ic}, y_{ic}$) of the center $Q_{ic}$ of the circular arc of the cross-sectional contour are found from the equations $$x_{ic} = (x_{2c} - x_{1c}) \cdot k \cdot i + x_{1c} \quad (7)$$

$$y_{ic} = (y_{2c} - y_{1c}) \cdot k \cdot i + y_{1c} \quad (8)$$

The arcuate cross-sectional contour $S_i$ is displayed by using these coordinate values.

Thereafter, i is counted up in accordance with the expression $$i+1 \rightarrow i$$

and it is determined whether $i \leq n$ holds.

If $i \leq n$ holds, the foregoing processing is executed again to display the next cross-sectional contour $S_i$.

If $i \leq n$ holds, on the other hand, this means that all cross-sectional contours $S_i$ (i=1, 2, ... n) of the subject block have been displayed. This is followed by taper-cut contour display processing for the next block.

If wire electrode paths on the upper and lower surfaces of the workpiece as well as plural cross-sectional contours of the taper-cut surface that lie parallel to the lower surface of the workpiece are thus displayed, the taper-cut contour can be comprehended with ease, thereby greatly facilitating the checking of the program.

Figure 6:
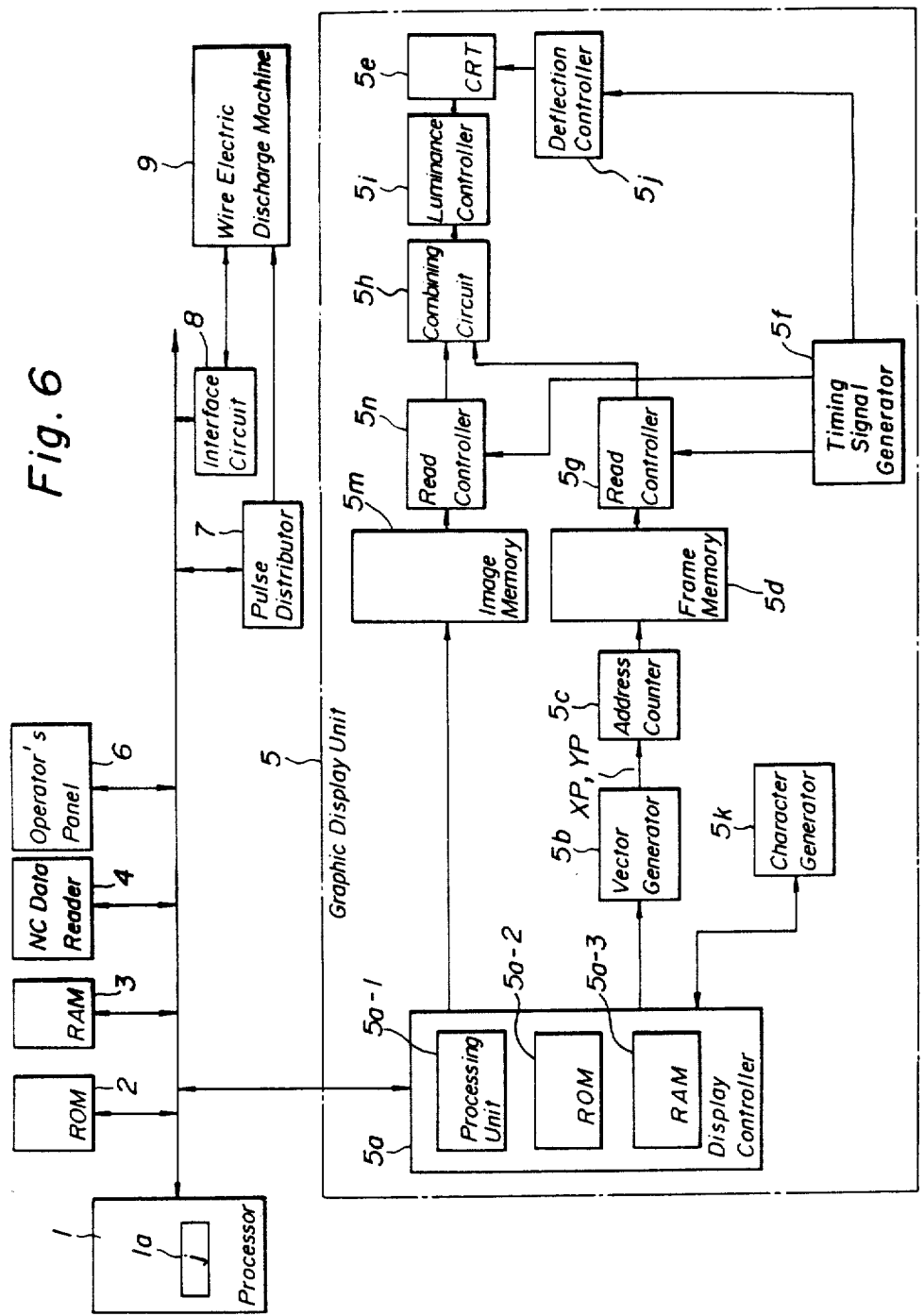
FIG. 6 is a block diagram of an apparatus for practicing the cut contour display method of the present invention.
Figure 7:
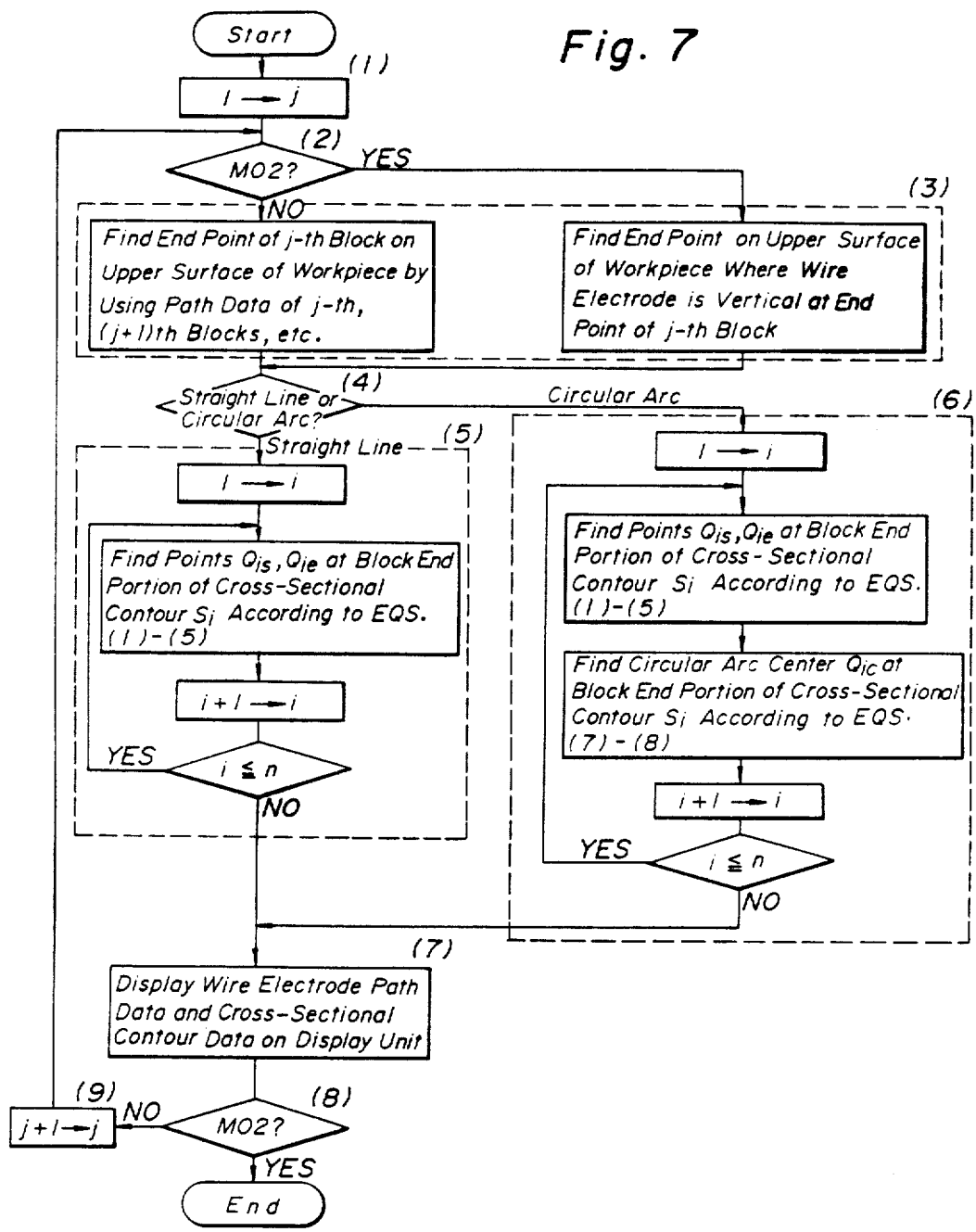
FIG. 7 is a flowchart of processing illustrating the cut contour display method of the present invention.

FIG. 6 is a block diagram of an NC apparatus for practicing the cut contour display method of the present invention, and FIG. 7 is a flowchart of processing according to the present invention.

In FIG. 6, numeral 1 denotes a processor, 2 a ROM storing a control program, 3 a RAM for storing various data, 4 an NC data reader for reading NC data from an NC tape (not shown), 5 a graphic display unit, 6 an operator's panel, 7 a pulse distributor, 8 an interface circuit, and 9 a wire electric discharge machine. The present invention will now be described in accordance with the flowchart shown in FIG. 7.

(1) The NC data reader 4 is made to read NC data in advance and to store the data in the RAM 3. In this state, switches provided on the operator's panel 6 are operated to enter workpiece thickness T and the number n of cross-sectional contours, and to produce a program check request signal.

In response, the processor 1 stores T and n in RAM 3 and initializes the data j in an internal register 1a to 1.

(2) Next, the processor 1 reads path data of a j-th block $b_j$ and (j+1)th block $b_{j+1}$ stored in the RAM 3 and determines whether "M02", which is indicative of program end, is contained in the (j+1)th block.

(3) If "M02" is not contained in the (j+1)th block, the processor 1 uses the program data of the j-th block and (j+1)th block to find the wire electrode position on the upper surface of the workpiece at the end of thej-th block $b_j$ in the manner described above. If "M02" is contained in the (j+1)th block, then the wire electrode position on the upper surface of the workpiece is found for a case where the wire electrdoe is vertical.

(4) Thereafter, it is determined whether the contour of the j-th block is a straight line or a circular arc. Whether the contour is a straight line or a circular arc can be determined by checking whether linear cutting (G-function instruction G01) or circular arc cutting (G02, G03) is commanded by the NC program data.

(5) If the contour of the j-th block is a straight line then the above-described processing (A) for the case where the wire electrode path is a straight line, is performed to find the coordinate values of points $Q_{is}$, $Q_{ie}$ on each cross-sectional contour $S_i$ (i=1, 2, 3 ... n) at the end of the j-th block $b_j$ until i=n holds.

(6) If the contour of the j-th block is a circular arc, on the other hand, then the above-described processing (B) for the case where the wire electrode path is a circular arc, is performed to find the coordinate values of points $Q_{is}$, $Q_{ie}$ (the starting and and points of each cross-sectional contour) on each cross-sectional contour $S_i$ (i=1, 2, 3 ... n) at the end of the j-th block, until i=n holds.

(7) When data specifying each of the cross-sectional contours of the j-th block have been obtained through the foregoing processing, the processor 1 provides a display controller 5a of the graphic display unit 5 with an input of the wire electrode position on the upper surface of the workpiece at the end of the j-th block, and an input of the data specifying each cross-sectional contour $S_i$ of the j-th block in addition to the wire electrode path data for the upper and lower surfaces of the workpiece in the j-th block. In a case where j=1 holds, the wire electrode is in the vertical attitude. Accordingly, the wire electrode position on the upper surface of the workpiece coincides with that on the lower surface of the workpiece in the X-Y plane at the beginning of the first block.

The display controller 5a of the graphic display unit 5 is constituted by a computer and includes a processing unit 5a-1, a ROM 5a-2 and a RAM 5a-3. When the above-mentioned data enter from the processor 1, the processing unit 5a-1 generates picture information conforming to the wire electrode paths on the upper and lower surfaces of the workpiece by using the input data, stores the information in the RAM 5a-3, generates picture information relating to each cross-sectional contour $S_i$, and stores this information in the RAM 5a-3.

Thereafter, the processing unit 5a-1 delivers the picture infdrmation (picture information relating to the wire electrode paths on the upper and lower surface of the workpiece and to each cross-sectional contour $S_i$, the information being classified according to straight lines and circular arcs and constituted by starting points and end points) stored in RAM 5a-3 to a vector generator 5b one item at a time. The vector generator 5b erforms ordinary linear or circular arc interpolation by using the entered picture information, thereby generating interpolated pulses XP, YP along the respective axis, these pulses being fed into an address counter 5c. The address counter 5c has X- and Y-axis address counters (not shown) for counting the interpolated pulses along the respective axes. Whenever a pulse is counted, a "1" is written into a frame memory 5d at a storage location designated by the X- and Y-axis address counters. When a picture conforming t- the wire electrode paths on the upper and lower surface of the workpiece of the j-th block and to each cross-sectional contour $S_j$ of the j-th block has been stored in the frame memory 5d through the foregoing pressing, the stored information is read out of the frame memory 5d in synchronism with the deflection of the beam of a CRT 5e, and luminance modulation is performed by using the stored information, thereby the wire electrode paths on the upper and lower surfaces of the workpiece and each cross-sectional contour of the tapered surface up to the j-th block are displayed on the CRT 5e. It should be noted that a timing signal for reading the stored information out of the frame memory 5d and a timing signal for deflecting the beam are produced by a timing signal generator 5f. A read controller 5g reads the stored information out of the frame memory 5d based on the timing signal, and the stored information is applied to a luminane controller 5i via a combining circuit 5h. The lumnance controller 5i executes luminance modulation o the basis of the stored information. A deflection controller 5j deflects the beam horizontally and vertically in synchronism with the timing signal. Numeral 5m denotes an image memory for storing character images, and 5n denotes a read controller.

Figure 8:
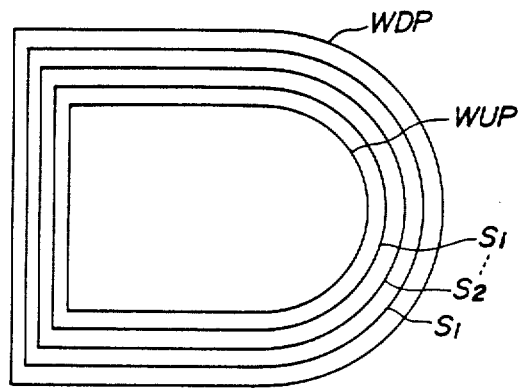
FIG. 8 is a diagram for describing an example of a display for a case where a taper-cut contour is displayed in an X-Y plane in accordance with the present invention.

(8) In parallel with the above-described image display processing by the graphic display unit 5, the processor 1 determines whether the (j+1)th block of numerical control data (programmed path data) contains "M02", which indicates the end of the program. If the block does contain "M02", this indicates that the wire electrode paths on the upper and lower surfaces of the workpiece for all blocks and all cross-sectional contours in each block have been stored in the frame memory 5d; hence, processing is terminated. The stored information is subsequently read out of the frame memory 5d, whereby the CRT 5e displays the wire electrode paths lying on the upper and lower surfaces of the workpiece, as well as the cross-sectional contours $S_i$ of the tapered surface in each block, as shown in FIG. 8.

(9) If "M02" is not contained in the block, on the other hand, j is updated through the operation $$j+1 \rightarrow j$$

and the foregoing processing is then repeated until until "M02" is sensed.

In the case described above, the image is displayed on the CRT 5e with the wire electrodes paths on the upper and lower surfaces of the workpiece and the cross-sectional contours of the tapered surface projected onto the XY plane. However, control can be so executed an to display these in the form of a perspective view. A case in which a perspective view is displayed will now be described.

Figure 9:
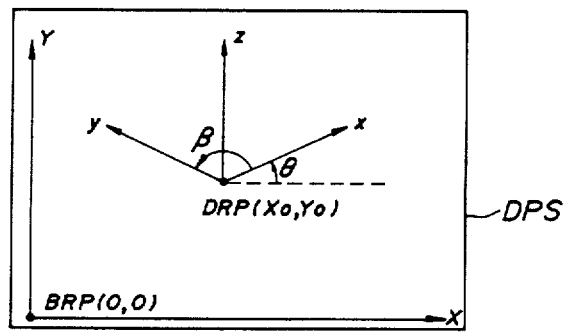
FIG. 9 is a diagram for illustrating the principle for displaying a perspective view.

FIG. 9 is a diagram for describing a case where a perspective view is displayed. In the Figure DPS represents the CRT display screen (CRT screen), BRP denotes the origin of the graphic coordinate system (X-Y coordinate system) of the CRT screen (the coordinates of the origin being (0,0); DRP designates the origin of three-dimensional coordinate axes (x-y-z) of a perspective view displayed on the CRT screen (the coordinates of the origin being $(X_o, Y_o)$; $\theta$ represents an angle defi-ed by the X axis of the graphic coordinate system and the x axis of the three-dimensicnal coordinate axes of the perspective view displayed on the CRT screen (the counter-clockwise direction is taken as being positive, with the X axis serving as the reference); and $\beta$ denotes an angle defined by the x and y axes of the three-dimensional coordinate axes of the perspective view display on the CRT screen. Coordinate values (x,y,z) expressed in the three-dimensional coordinate system are transformed into coordinate values (X,Y) in the graphic coordinate system by the equation $$\begin{pmatrix} X \\ Y \end{pmatrix} = \begin{pmatrix} \cos\theta & \cos(\theta+\beta) & 0 \\ \sin\theta & \sin(\theta+\beta) & 1 \end{pmatrix} \begin{pmatrix} x \\ y \\ z \end{pmatrix} + \begin{pmatrix} X_o \\ Y_o \end{pmatrix} \quad (9)$$

Accordingly, if the three-dimensional coordinate values (x,y,z), the angles $\theta$, $\beta$ and the coordinate values $(X_o, Y_o)$ of the three-dimensional coordinate system origin DRP is the graphic coordinate system are given, the graphic display unit 5 (FIG. 6) will be capable of applying the transformation process of Eq. (9) to each of the three-dimensional coordinate values to obtain the coordinate values in the graphic coordinate system, and of displlaying the perspective view on the CRT screen by using the coordinate values in the graphic coordinate system.

Figure 10:
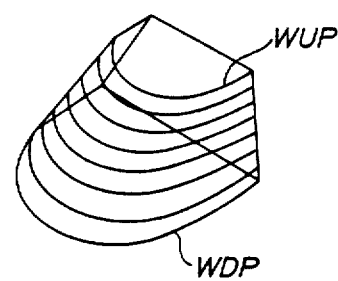
FIG. 10 is a perspective view of a taper-cut contour display in accordance with the present invention.

Let the Z-axis coordinate value of the lower surface of the workpiece be 0. In such case the three-dimensional coordinate values of the points A, B, C, D ... (see FIG. 3) on the programmed path (wire electrode path) lying in the lower surface of the workpiece will be $(x_{1i}, y_{1i}, 0)$, and the three-dimensional coordinate values of the points A', B', C', D' ... on the wire electrode pa h lying on the upper surface of the workpiece will be $(x_{2i}, y_{2i}, T)$, where $(x_{1i}, y_{1i})$ are the XY plane coordinate values of each point on the lower surface of tne workpiece, $(x_{2i}, y_{2i})$ are the XY plane coordinate values of each point on the upper surface of the workpiece, and T is the workpiece thickness. Accordingly, if the above-mentioned angles $\theta$, $\beta$ and the coordinate values $(X_o, Y_o)$ of the three-dimensional origin DRP in the graphic coordinate system are stored beforehand in the RAM 5a-3 of display controller 5a, the wire electrode positions (three-dimensional coordinate values) on the upper and lower surfaces of the workpiece at the starting and end points of a block, the positions of each cross-sectional contour and the arc enter position thereof (three-dimensional coordinate values) at the end of a block are obtained and these are fed into the display controller 5a, then the display controller 5a will apply the transformation process of Eq. (9) to these input data and generate image data conforming to the wire electrode paths on the upper and lower surfaces of the workpiece and to each cross-sectional contour. A perspective view will be displayed on the CRT screen 5e, as shown in FIG. 10, based on these image data. It should be noted that the heights $Z_2$, $Z_1$ of the upper and lower surfaces of the workpiece, as well as the height Z of the cross section Si, are found from the equations $$Z_1 = 0$$

$$Z_2 = T$$

$$Z = (Z_2 - Z_1) \cdot k \cdot i + Z_1$$

Though the foregoing description does not deal with a color display, it is of course possible to adopt an arrangement in which the wire electrode paths on the upper and lower surfaces of the workpiece and each cross-sectional contour ar displayed in different colors. To achieve such a color display, the frame memory 5d would be constituted by three frame memories for read, blue and green and, by way of example, the wire electrode path on the upper surface of the workpiece would be displayed in red, that on the lower surface of the workpiece in yellow, and each cross-sectional contour in blue. In such case, the image of the wire electrode path on the upper surface of the workpiece produced by the vector generator 5b would be stored in the frame memory for red, the image of the wire electrode path on the lower surface of the workpiece would be stored in the two frame memories for red and green, the image of each cross-sectional contour would be stored in the frame memory for blue, and these images would then be read out of the respective frame memories and applied to a predetermined grid electrode of a color cathode ray tube According to the present invention as described above, it is arranged to display not only a wire electrode path constituting a programmed path on the lower surface of a workpiece (i.e., the cut contour of the lower surrace of the workpiece ) and a wire electrode patn on the upper surface of the workpiece (i.e,. the cut contour of the upper surface of the workpiece), but also a plurality of cross-sectional contours, which lie parallel to the lower surface of the workpiece, of a taper-cut surface in each block. Accordingly, the taper-cut contour can be recognized with ease to simplify the checking of the program. In addition, the taper-cut contour can be displayed not only as a projection on the XY plane but also as a perspective view. This makes it easy to comprehend the taper-cut profile.

What is claimed is:

1. A cut contour display method in a wire electric discharge machine for subjecting a workpiece to taper cutting by moving a workpiece relative to a wire electrode and moving a wire tensioning guide horizontally, comprising the steps of:

(a) entering path data for a plurality of blocks defining a programmed path lying on an upper or lower surface of the workpiece, workpiece thickness I, data consisting of a taper angle $a_1$ in each block or vector $(u_i, v_i)$ indicative of a positional offset between the upper and lower surfaces of the workpiece at the ends of the block, and data specifying a number of cross sections parallel to the lower surface of the workpiece and cutting a taper-cut surface;

(b) obtaining a wire electrode path on whichever one of the upper and lower surfaces of the workpiece does not have the programmed path lying thereon by using the programme path, workpiece thickness T, taper angle $a_i$ or vector $(u_i, v_i)$ indicative of the positional offset between the upper and lower surfaces of the workpiece at the end of the block;

(c) obtaining coordinate values of points on each cross-sectional contour at an end portio of each block by using data indicative of the wire electrode paths on the upper and lower surfaces of the workpiece and the number of cross section; and (d) displaying, on a display unit, the wire electrode paths on the upper and lower surfaces of the workpiece as well as each cross-sectional contour of the taper-cut surface, by using the data indicative of the wire electrode paths on the upper and lower surfaces of the workpiece and coordinate values of the points on each cross-sectional contour at the end portion of each block.

2. A cut contour display method in a wire electric discharge machine according to claim 1, wherein when the vector $(u_i, v_i)$ indicative of the positional offset at the end of each block is given, said step (b) includes calculating coordinates of an end point of an i-th block on the workpiece surface which does not have the programmed path lying thereon in accordance with expessions $$x_i + u_i, \quad y_i + v_i$$

where $(x_i, y_i)$ represent coordinate values of a programmed path end point in the i-th block.

3. A cut contour display method in a wire electric discharge machine according to claim 1, wherein the wire electrode paths on the upper and lower surfaces of the workpiece and each cross-sectional contour are displayed in predetermined colors.

4. A cut contour display method in a wire electric discharge machine for subjecting a workpiece to taper cutting by moving a workpiece relative to a wire electrode and moving a wire tensioning guide horizontally comprising the steps of:

(a) entering path data for a plurality of blocks defining a programmed path lying on an upper or lower surface of the workpiece, workpiece thickness T, data consisting of a taper angle $a_i$ in each block or a vector $(u_i, v_i)$ indicative of a positional offset between the upper and lower surface of the workpiece at the end of the block, and data specifying a number of cross sections parallel to the lower surface of the workpiece and cutting a taper-cut surface;

(b) obtaining a wire electrode path on whichever one of the upper and lower surfaces of the workpiece does not have the programmed path lying thereon by using the programmed path, workipiece thickness T, taper angle $a_i$ or vector $(u_i, v_i)$ indicative of the positional offset between the upper and lower surfaces of the workpiece at the end of the block, wherein when the taper angle $\alpha_i$ in each block is entered, said step (b) includes the substeps of:

finding a path obtained by offsetting the programmed path in an i-th block by $T \tan \alpha_i$;

finding a path obtained by offsetting the programmed path in an (i+1)th block by $T \tan \alpha_{i+1}$; and fining a point of intersection between the two paths found, the point of intersection serving as coordinates of an end point of the i-th block on the workpiece surface which does not have the programmed path lying thereon;

(c) obtaining coordinate values of points on each cross-sectional contour at an end portion of each block by using data indicative of the wire electrode paths on the upper and lower surfaces of the workipiece and the number of cross section; and (d) displaying, on a display unit, the wire electrode paths on the upper and lower surfaces of the workpiece as well as each cross-sectional contour of the taper-cut surface, by using the data indicative of the wire electrode paths on the upper and lower surfaces of the workpiece and coordinate values of the points on each cross-sectional contour at the end portion of each block.

* * * * *

UNITED STATES PATENT AND TRADEMARK OFFICE
CERTIFICATE OF CORRECTION

PATENT NO. : 4,713,517

DATED : December 15, 1987

INVENTOR(S) : Mitsuo KINOSHITA

It is certified that error appears in the above-identified patent and that said Letters Patent is hereby corrected as shown below:

Column 2, line 39, "display" should be --displayed--.
Column 3, line 10, "S.tan$\alpha$" should be --S·tan$\alpha$--.
Column 4, line 19, "$\alpha$il, $\alpha$i+1" should be --$\alpha_i$, $\alpha_{i+1}$--.
Column 5, line 8, "i<n" should be i>n--.
Column 6, line 32, "thej-th" should be --the j-th--;
line 53, "and" (second occurrence) should be --end--.
Column 7, line 14, "infdrmation" should be --information--;
line 21, "er-" should be -- per- --;
line 25, "axis" should be --axes--;
line 31, "t-" should be --to--;
line 50, "o" should be --on--.

UNITED STATES PATENT AND TRADEMARK OFFICE
CERTIFICATE OF CORRECTION

PATENT NO. : 4,713,517

DATED : December 15, 1987

INVENTOR(S) : Mitsuo KINOSHITA

It is certified that error appears in the above-identified patent and that said Letters Patent is hereby corrected as shown below:

Column 8, line 14, "an" should be --as--;
line 23, "(0,0);" should be (0,0));--;
line 26, "$(X_o,Y_o)$;" should be --$(X_o,Y_o)$);--;
"defi-ed" should be --defined--;
line 58, "in" should be --on--;
lines 60-61, "pa h" should be --path--;
line 63, "tne" should be --the--.
Column 9, line 29, "ar" should be --are--;
line 52, "patn" should be --path--.
Column 10, line 3, "I" should be --T--;
line 7, "ends" should be --end--;
line 14, "programme" should be --programmed--;
line 19, "portio" should be --portion--;
line 22, "section" should be --sections--;
line 59, "surface" should be --surfaces--.

Signed and Sealed this

Seventh Day of June, 1988

*Attest:*

DONALD J. QUIGG

*Attesting Officer*  *Commissioner of Patents and Trademarks*